United States Patent

[11] 3,619,680

| [72] | Inventor | Atutoshi Okamoto<br>Toyohashi, Japan |
|---|---|---|
| [21] | Appl. No. | 14,564 |
| [22] | Filed | Feb. 26, 1970 |
| [45] | Patented | Nov. 9, 1971 |
| [73] | Assignee | Nippondenso Kabushiki Kaisha Kariya-shi<br>Aichi-ken, Japan |
| [32] | Priority | Mar. 26, 1969 |
| [33] | | Japan |
| [31] | | 44/26910 |

[54] DEVICE FOR DETECTING THE WHEEL SPEED OF AN AUTOMOBILE
3 Claims, 1 Drawing Fig.

[52] U.S. Cl. .................................................. 310/168
[51] Int. Cl. .................................................. H02k 19/24
[50] Field of Search .................................................. 310/168,
171, 169, 156, 170, 261; 324/174; 340/58, 263;
180/105; 74/866

[56] References Cited
UNITED STATES PATENTS

| 3,458,741 | 7/1969 | Woodward | 310/168 |
| 3,469,662 | 9/1969 | Dewar | 324/174 X |
| 3,482,129 | 12/1969 | Riordan | 310/168 |
| 3,492,518 | 1/1970 | Wayne | 310/168 |
| 3,515,920 | 6/1970 | Jones | 310/168 |

FOREIGN PATENTS

| 835,020 | 5/1960 | Great Britain | 324/174 |
| 1,287,208 | 1/1963 | Germany | 324/174 |

Primary Examiner—D. X. Sliney
Assistant Examiner—R. Skudy
Attorney—Cushman, Darby & Cushman ABSTRACT: A device for detecting the wheel speed of an automobile including a rotary disc of magnetic material having projections in the periphery thereof and attached to a transmission shaft in combination with a pulse signal generator having a magnet and a coil wound around the magnet. The pulse signal generator is mounted on the housing of an extension adjacent the rotary disc so that the rotation of the rotary disc produces a high-voltage level pulse signal proportional in number to the wheel speed.

PATENTED NOV 9 1971 3,619,680
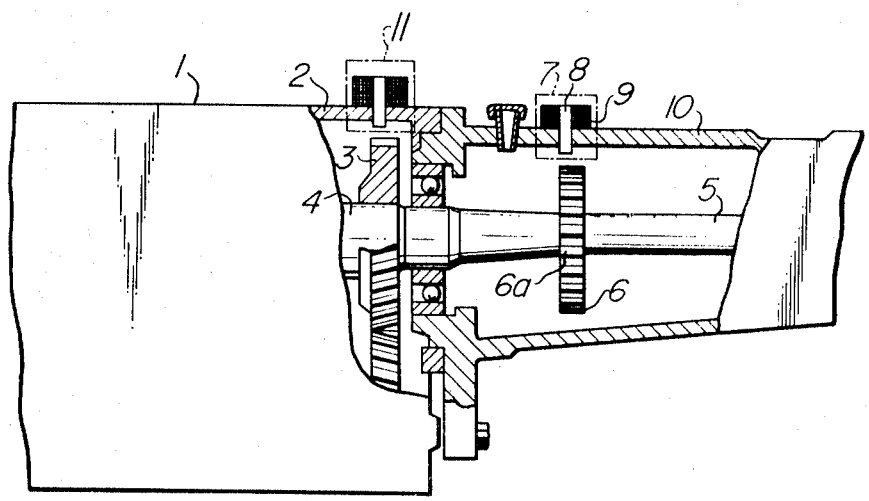
INVENTOR
OKAMOTO, Atutoshi
BY Cushman, Darby & Cushman
ATTORNEYS

DEVICE FOR DETECTING THE WHEEL SPEED OF AN AUTOMOBILE

BACKGROUND OF THE INVENTION

1. Field of the Invention

The present invention relates to a device for detecting the wheel speed of an automobile to produce a voltage corresponding thereto.

2. Description of the Prior Art

The prior art device of this kind comprises, generally, a rotary disc made of magnetic material and having a plurality of projections provided in the periphery thereof, said rotary disc being secured to a shaft within the brakedrum, and a pulse signal generator comprising a magnet and a coil and mounted in the brakedrum in proximity to the outer periphery to the rotary disc. A pulse signal obtained from the coil is proportional to the wheel speed and is converted into an analog signal by a D-A converter. Thus, the analog signal so obtained has a voltage level proportional to the wheel speed.

In order to detect the wheel speed without any time lag, it is necessary to increase the number of the pulses generated from the pulse signal generator for one revolution of the wheel. However, since there exist space limitations in the brakedrum of an ordinary passenger motor car, the maximum number of pulses obtained with a device in which the rotary disc and the pulse signal generator are contained within the brakedrum is approximately 60. This maximum value is based on the fact that if one would form the rotary disc with more than 60 projections so as to further increase the number of the pulses obtained the size of the projections would naturally become extremely small, and therefore the number of interlinkages of the magnetic flux with that generated by the coil decreases with a resulting drop in the voltage level of the output signal of the pulse signal generator. And, the pulse signal generator induces a noise signal voltage in addition to the required signal corresponding to the wheel speed of the automobile. Furthermore, since the drop in the voltage level of the output signal of the pulse signal generator means a reduction in the signal-to-noise ratio of the output signal of the signal detector, it is extremely difficult to discriminate between the required signal voltage corresponding to the wheel speed and the noise signal voltage when the output voltage is amplified.

SUMMARY OF THE INVENTION

It is an object of the present invention to provide a device for detecting the wheel speed of an automobile comprising a rotary disc made of magnetic material and having a plurality of projections provided in the periphery thereof, said rotary disc being secured to the output shaft of a transmission or a driven shaft, and a pulse signal generator comprising a magnet and a coil, said pulse signal generator being mounted on the housing of an extension or that of the transmission in proximity to the outer periphery of said rotary disc.

In accordance with one feature of the present invention, the pulse signal generator generates a signal voltage which is four times as high as that generated by the conventional devices, without increasing the number of the projections peripherally provided in the rotary disc, so that the signal-to-noise ratio of the signal voltage is multiplied approximately by four. Therefore, the design of the amplifier for amplifying the signal voltage is considerably simplified, that is, it becomes easier to design the amplifier against the noise due to the power source of the amplifier.

In accordance with another feature of the present invention the pulse signal generator generates output pulses the number of which, counted for one revolution of the wheel, is four times as many as that of the conventional devices, so that the accuracy of detection of the wheel speed is remarkably increased. Furthermore, it is possible to make larger the gap between the pulse signal generator and the rotary disc. Moreover, since the housing of the extension or that of the transmission has a space sufficient to accommodate the pulse signal generator and the rotary disc, no difficulties are encountered in mounting these within the space.

BRIEF DESCRIPTION OF THE DRAWING

The figure is a partially broken away schematic view showing, partly in section, one embodiment of the device for detecting the wheel speed of an automobile according to the present invention.

DESCRIPTION OF THE PREFERRED EMBODIMENT

Referring to the drawing, a transmission, generally indicated at 1, to which the present invention is applicable comprises a housing 2, one of the transmission gears 3 contained within the housing 2, a driven shaft 4 and an output shaft 5 of the transmission 1.

Secured to the output shaft 5 of the transmission 1 is a rotary disc 6 made of magnetic material and having a plurality of projections 6a provided in the periphery of the rotary disc 6.

A pulse signal generator generally indicated at 7, comprises a magnet 8 and a coil 9 wound on the magnet 8. The pulse signal generator 7 is mounted on the housing of an extension 10 in such a manner that the magnet 8 is in proximity to the outer periphery of the rotary disc 6.

In operation, the coil 9 of the pulse signal generator 7 generates a pulse signal voltage proportional to the rotational speed of the output shaft 5 of the transmission 1, when the rotary disc 6 rotates with the driven shaft 4 and the output shaft 5 of the transmission 1. The digital signal thus obtained is then converted into an analog signal by the use of a D-A converter (not shown), the analog signal being a voltage proportional to the wheel speed.

It is to be noted that the pulse signal generator 7 induces a signal voltage which is four times as high as that corresponding to the wheel speed, since when the output shaft 5 of the transmission 1 rotates four times, the wheel rotates only once. Therefore, the accuracy of detection of the wheel speed is multiplied by four. Furthermore, the number of the pulses generated from the pulse signal generator 7 is four times as many as that corresponding to one revolution of the wheel, so that the signal-to-noise ratio (assuming the noise signal voltage to be constant) is multiplied by four.

It should be noted that the rotary disc may alternatively be secured to the driven shaft 4 within the housing 2 of the transmission 1. In this case, the transmission gear 3 is used as a substitute for the rotary disc, and the pulse signal generator 11 (the same internal construction as generator 7 previously discussed) is, as shown by the chain center line, mounted on the housing 2 of the transmission 1 in such a manner that the magnet of the pulse signal generator 11 is in proximity to the outer periphery of the transmission gear 3. Needless to say, it is required that the transmission gear 3 is made of magnetic material.

I claim:

1. A device for detecting the wheel speed of an automobile where the automobile is driven by a mechanical transmission and associated rotationally driven shafts having a housing thereabout wherein the rotational speeds of said driven shafts are higher than the rotational speed of the automobile wheel, said device comprising:

a rotary disc made of magnetic material and having a plurality of projections provided in the outer periphery thereof, said rotary disc being secured to one of said rotationally driven shafts, and a pulse signal generator comprising a magnet and a coil assembly, said pulse signal generator being mounted on said housing with the magnet disposed in proximity to the outer periphery of the rotary disc whereby output pulse signals proportional in number to the wheel speed are produced with a higher voltage due to the increased rotational speed of said rotationally driven shafts with respect to the rotational speed of said wheel.

2. A device as in claim 1 wherein said rotationally driven shaft comprises a driven output shaft of said transmission having an extended portion of said housing disposed thereabout with said pulse signal generator being mounted on said extended housing.

3. A device as in claim 1 wherein said rotationally driven shaft comprises an element of the transmission and said rotary disc comprises a magnetic gear element of said transmission.

* * * * *